(12) United States Patent
Badeau

(10) Patent No.: US 11,927,565 B2
(45) Date of Patent: Mar. 12, 2024

(54) TECHNIQUES FOR ADAPTING TIME DELAYS OF ULTRASOUND INSPECTION SYSTEM DURING DATA ACQUISITION

(71) Applicant: Evident Canada, Inc., Québec (CA)

(72) Inventor: Nicolas Badeau, Quebec (CA)

(73) Assignee: Evident Canada, Inc., Québec (CA)

( * ) Notice: Subject to any disclaimer, the term of this patent is extended or adjusted under 35 U.S.C. 154(b) by 206 days.

(21) Appl. No.: 17/651,926

(22) Filed: Feb. 22, 2022

(65) Prior Publication Data

US 2022/0381743 A1 Dec. 1, 2022

Related U.S. Application Data

(60) Provisional application No. 63/194,125, filed on May 27, 2021.

(51) Int. Cl.
*G01N 29/06* (2006.01)
*G01B 17/02* (2006.01)
*G01N 29/07* (2006.01)
*G01N 29/24* (2006.01)
*G01N 29/28* (2006.01)

(52) U.S. Cl.
CPC ........... *G01N 29/069* (2013.01); *G01B 17/02* (2013.01); *G01N 29/07* (2013.01); *G01N 29/2406* (2013.01); *G01N 29/2437* (2013.01); *G01N 29/28* (2013.01); *G01N 2291/011* (2013.01); *G01N 2291/023* (2013.01); *G01N 2291/0289* (2013.01); *G01N 2291/101* (2013.01)

(58) Field of Classification Search
CPC .. G01N 29/069; G01N 29/07; G01N 29/2406; G01N 29/2437; G01N 29/28; G01N 2291/011; G01N 2291/023; G01N 2291/0289; G01N 2291/101; G01N 29/262; G01N 29/341; G01N 2291/0231; G01N 2291/02854; G01N 2291/106; G01B 17/02

See application file for complete search history.

(56) References Cited

U.S. PATENT DOCUMENTS 6,368,279 B1  4/2002 Liu
2012/0281902 A1* 11/2012 Oikawa ............... G01S 7/52034
                                                    382/131
2018/0246207 A1  8/2018 Brown et al.

OTHER PUBLICATIONS

Fyleris, Tautvydas, "The Development of Ultrasonic Adaptive Method for Inspection of Objects With Complex Geometry (Thesis)", Kaunas University of Technology, (2020), 110 pgs.
He, Ping, "Simultaneous measurement of sound velocity and wall thickness of a tube", Ultrasonics 39, (2001), 407-411.

(Continued)

*Primary Examiner* — Tarun Sinha
(74) *Attorney, Agent, or Firm* — Schwegman Lundberg & Woessner, P.A.

(57) ABSTRACT

Techniques for compensating a TFM delay computation live (e.g., during acquisition) as a function of the measured thickness along the scan axis of a probe of an acoustic inspection system. At various scan positions, the acoustic inspection system can measure the thickness of the object under test. With the measured thickness, the acoustic inspection system can compute the delays used for the TFM computation to reflect the actual thickness at that particular scan position of the probe.

24 Claims, 5 Drawing Sheets

(56) References Cited

OTHER PUBLICATIONS

Horchens, Lars, et al., "Adaptive ultrasonic imaging of electric resistance welded pipeline seams", ECNDT, [Online]. Retrieved from the Internet: <URL: http://www.ndt.net/?id=22724>, (2018), 8 pgs.

Hoyle, C, et al., "Ultrasonic algorithms for calculating probe separation distance, combined with full matrix capture with the total focusing method", Insight, vol. 62, No. 4, (Apr. 2020), 199-207.

Le Jeune, Leonard, et al., "Adaptive Ultrasonic Imaging with the Total Focusing Method for Inspection of Complex Components Immersed in Water", QNDE Conference, (2014), 10 pgs.

Mahaut, S, et al., "An adaptive system for advanced NDT applications using phased arrays", Ultrasonics 36, (1998), 127-131.

Robert, Sebastien, et al., "Adaptive Ultrasonic Imaging with a Phased-array Probe Equipped with a Conformable Wedge", 19th World Conference on Non-Destructive Testing, [Online]. Retrieved from the Internet: <URL: http://ndt.net/?id=19646>, (2016), 8 pgs.

Robert, Sebastien, et al., "Real-Time Adaptive Imaging for Ultrasonic Nondestructive Testing of Structures with Irregular Shapes", 11th NDE, (2015), 19 pgs.

Robert, Sebastien, et al., "Surface Estimation Methods with Phased-Arrays for Adaptive Ultrasonic Imaging in Complex Components", AIP Conference Proceedings 1650, [Online]. Retrieved from the Internet: <URL: https://doi.org/10.1063/1.4914787>, (2015), 1657-1666.

\* cited by examiner $$\hat{A}(n) = \begin{bmatrix} \tau(n, x_0, z_0) & \cdots & \tau(n, x_N, z_0) \\ \vdots & \ddots & \vdots \\ \tau(n, x_0, z_N) & \cdots & \tau(n, x_N, z_N) \end{bmatrix}$$

TECHNIQUES FOR ADAPTING TIME DELAYS OF ULTRASOUND INSPECTION SYSTEM DURING DATA ACQUISITION

CLAIM OF PRIORITY

This application claims the benefit of priority of U.S. Provisional Patent Application Ser. No. 63/194,125, titled "TECHNIQUES FOR ADAPTING TIME DELAYS OF ULTRASOUND INSPECTION SYSTEM DURING DATA ACQUISTION" to Nicholas Badeau, filed on May 27, 2021, the entire contents of which being incorporated herein by reference.

FIELD OF THE DISCLOSURE

This document pertains generally, but not by way of limitation, to non-destructive testing and inspection devices (NDT/NDI).

BACKGROUND

Various techniques can be used to perform inspection of structures in a non-destructive manner. Such techniques can include use of ionizing radiation such as X-rays for inspection, electromagnetic techniques such as eddy-current techniques, or acoustic techniques, as illustrative examples. In one approach, an ultrasonic transducer or an array of such transducers can be used to inspect a structure using acoustic energy. Ultrasonic inspection is useful for inspection of a variety of different structures including bar-shaped or tubular structures, welds, planar (e.g., plate materials), and composite materials such as carbon-fiber reinforced composite structures.

Inhomogeneities on or within the structure under test can generate scattered or reflected acoustic signals in response to a transmitted acoustic pulse. Such acoustic "echoes" can be received and processed. Such processing can include reconstruction of an image corresponding to a region of the structure under test, for review by an inspector or for archival. Features within the structure that can be detected and thereby imaged include interfaces between materials having different acoustic propagation characteristics, such as voids, cracks, or other flaws, and structures such as welds, joints, cladding layers, or surfaces.

An acoustic acquisition technique called a "total focusing method" (TFM) can be used, such as involving a full-matrix capture (FMC) acquisition scheme where focus can be achieved across a broad spatial region on or within a material under test. TFM techniques can be sensitive to setup parameters, such as the thickness of the inspected component. While some acoustic paths (e.g., T-T, L-L) are unaffected by these parameters, some paths (e.g., TT-T, TL-T) needs these parameters to be able to properly generate images.

SUMMARY OF THE DISCLOSURE

This disclosure describes techniques for compensating a TFM delay computation live (e.g., during acquisition) as a function of the measured thickness along the scan axis of a probe of an acoustic inspection system. At various scan positions, the acoustic inspection system can measure the thickness of the object under test. With the measured thickness, the acoustic inspection system can compute the delays used for the TFM computation to reflect the actual thickness at that particular scan position of the probe.

In some aspects, this disclosure is directed to a computer-implemented method of adapting time delays of an ultrasound inspection system during data acquisition, the computer-implemented method comprising: determining, using a representation of an estimated first thickness of an object under inspection, a first set of time delays associated with an acoustic source; determining, using a representation of an estimated second thickness of the object, a second set of time delays associated with the acoustic source; and at a first position of a probe positioned on the object; interpolating, using a representation of the first and second sets of time delays and a determined thickness of the object at the first position, a representation of an interpolated set of time delays associated with the acoustic source; acquiring first position acoustic data using the probe; and generating, using the representation of the interpolated set of time delays and the first position acoustic data, an acoustic image of the object at the first position.

In some aspects, this disclosure is directed to an ultrasound inspection system for adapting time delays during data acquisition, the ultrasound inspection system comprising: a probe to be positioned on an object under inspection; and a processor to: determine, using a representation of a first thickness of an object under inspection, a first set of time delays associated with an acoustic source; determine, using a representation of a second thickness of the object, a second set of time delays associated with the acoustic source; and at a first position of the probe positioned on the object: interpolate, using the first and second sets of time delays and a determined thickness of the object at the first position, a representation of an interpolated set of time delays associated with the acoustic source; acquire first position acoustic data using the probe; and generate, using the representation of the interpolated set of time delays and the first position acoustic data, an acoustic image of the object at the first position.

In some aspects, this disclosure is directed to a computer-implemented method of adapting time delays of an ultrasound inspection system during data acquisition, the computer-implemented method comprising: determining, using a representation of an estimated minimum thickness of an object under inspection, a first set of time delays associated with an acoustic source; determining, using a representation of an estimated maximum thickness of the object, a second set of time delays associated with the acoustic source; and at a first position of a probe positioned on the object: interpolating, using the first and second sets of time delays and a determined thickness of the object at the first position, a representation of an interpolated set of time delays associated with the acoustic source; acquiring first position acoustic data using the probe; and generating, using the representation of the interpolated set of time delays and the first position acoustic data, an acoustic image of the object at the first position.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
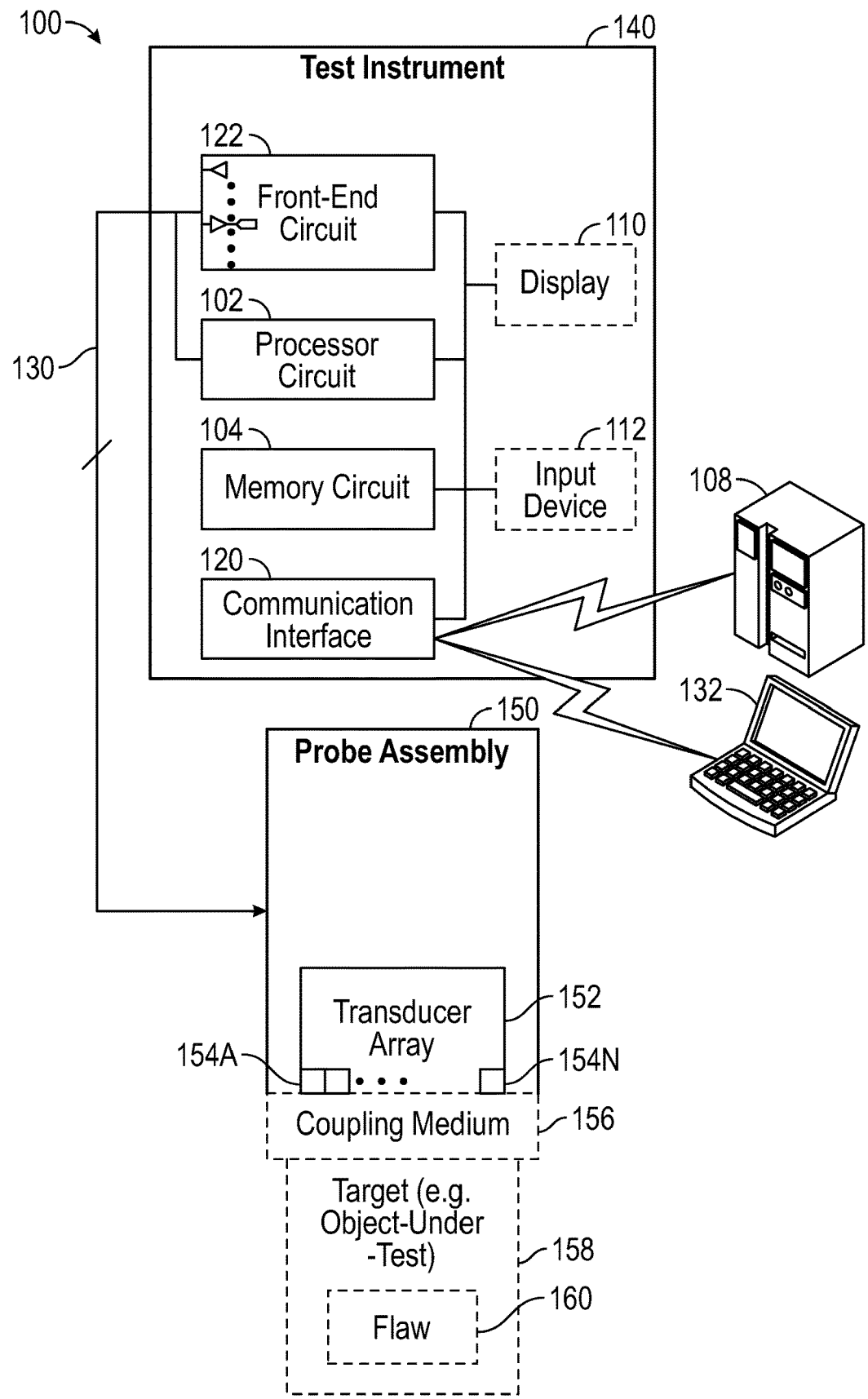
FIG. 1 illustrates generally an example of an acoustic inspection system, such as can be used to perform one or more techniques described herein.

As mentioned above, acoustic techniques can be used to perform non-destructive testing or inspection (sometimes referred to generally as non-destructive evaluation) of materials by coupling acoustic energy onto or within such materials and detecting scattered or reflected energy corresponding to features on or within such materials under test.

The hallmark of ultrasonic phased array is the capacity to focus and steer an acoustic beam at a desired position in a material under inspection. The phased array focusing approach uses delays, applied on both the transmission and reception elements of the phased array probe, to synchronize the time of flights of short, pulsed waveforms at the position of interest. At the focal zone in the material, the width of the generated acoustic beam narrows, and the corresponding probability of detection and lateral resolution increases.

Conventional phased array uses the physical superposition of elementary acoustic waves in transmission to produce an acoustic beam aimed at a specific focused depth in the material under inspection. The set of transmitter elements form an aperture from which a coherent acoustic pulse emerges. The action of conventional phased array transmission is referred to as beamforming. In an S-scan, for instance, beamforming acquisition occurs for each user-specified angle.

In some approaches, a plurality of acoustic transducers can be used to perform such acoustic inspection. Such a plurality of transducers can be referred to as an "array," but such an array need not be planar or linear in arrangement or orientation and need not have a constant pitch between respective transducer elements.

Processing of received acoustic echo signals to form images can involve various techniques. In one acoustic acquisition approach, respective received acoustic echo signals can be "delayed and summed" to provide focusing within a specific locus within the material under test, before and even beyond the material.

In another approach, an acoustic acquisition technique called a "total focusing method" (TFM) can be used, such as involving a full-matrix capture (FMC) acquisition scheme where focusing can be achieved within the material under test. TFM also uses a delay-and-sum algorithm. Several TFM propagation modes are available, where the TFM propagation modes represent the path of ultrasound waves from the transmitter to an image pixel in a TFM zone and back to the receiver (including reflections).

The TFM acoustic propagation modes are defined by the types of waves (transverse or longitudinal) for each leg of the path. A pulse-echo mode is any propagation mode where the transmitted beam and the reception beam follow the exact same path in the inspected piece. Pulse-echo modes can be achieved in a direct path with no skips, such as T-T, or with multiple skips, e.g., TT-TT. In a self-tandem mode, e.g., TT-T, the transmission and reception propagation paths do not match exactly, but the transmitting and receiving elements are on the same phased array probe. Pulse-echo and self-tandem propagation modes are not specific to the TFM; they can be obtained in a conventional phased array as well as the TFM.

The TFM algorithm is a form of dimensionality reduction, where acoustic data, typically arranged into a full matrix capture (FMC) matrix (a typical size can be 1024×4000 or greater) are summed using predefined generation parameters to form an image. A typical size of a TFM image can be 1024×1024 pixels or less.

Various generation parameters can be used to generate an image, such as a TFM image. For example, generation parameters can include wedge velocity, wedge angle, wedge first elements height, wedge radius, part velocity, part thickness, and/or the selected acoustic propagation mode(s).

To produce a pixel or voxel in an acoustic image of an object using TFM, for example, a processor can calculate the delays associated with that pixel or voxel using one or more generation and inspection parameters, then delays can be applied accordingly to the acoustic data, such as data in an FMC matrix, that was acquired by the acoustic imaging system. The processor can determine the amplitude at the particular delay, generate a scattering matrix ("S-matrix"), and then generate an image of the material being inspected. Each combination element-voxel has an associated delay. These delays can be used to determine the relevant data in the full matrix of acoustic data. The "particular delay" represents the delay needed for a specific combination of elements and pixel/voxel. The S-matrix, once summed, can be used by the processor to produce a pixel or voxel to generate an image.

As mentioned above, some techniques, such as TFM techniques, can be sensitive to setup parameters, such as the thickness of the object under inspection. While some acoustic paths (e.g., T-T, L-L) are unaffected by these parameters, some paths (e.g., TT-T, TL-T) need these parameters to be able to properly generate images. A difference between the actual thickness of the component and its nominal thickness can greatly affect the focalization of each pixel/voxel, which can negatively affect the representation of the feature(s) in the TFM images, for example. When the thickness used for the computation is incorrect, the flaw can be misrepresented, and artefacts can appear. For example, a difference of 10% in wall thickness can represent an amplitude difference of about 50% in the resulting TFM images.

The present inventor has recognized the desirability of compensating a TFM delay computation live (e.g., during acquisition) as a function of the measured thickness along the scan axis of a probe of an acoustic inspection system. At various scan positions, the acoustic inspection system can measure the thickness of the object under test. With the measured thickness, the acoustic inspection system can compute the delays used for the TFM computation to reflect the actual thickness at that particular scan position of the probe.

FIG. 1 illustrates generally an example of an acoustic inspection system 100, such as can be used to perform one or more techniques described herein. The acoustic inspection system 100 can perform ultrasonic NDT techniques. The acoustic inspection system 100 of FIG. 1 is an example of an acoustic imaging modality, such as an acoustic phased array system, that can implement various techniques of this disclosure.

The acoustic inspection system 100, also referred to in this disclosure as an acoustic inspection system, can include a test instrument 140, such as a hand-held or portable assembly. The test instrument 140 can be electrically coupled to a probe assembly, such as using a multi-conductor interconnect 130. The electrical coupling can be a wired connection or a wireless connection. The probe assembly 150 can include an acoustic source, e.g., one or more electroacoustic transducers, such as a transducer array 152 including respective transducers 154A through 154N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 150 configuration can be used, such as to allow a test instrument 140 to be used with various probe assemblies 150. In a non-limiting example, the transducer array 152 can include piezoelectric transducers, such as can be acoustically coupled to a target 158 (e.g., an object under test) through a coupling medium 156. In other examples, capacitive micromachined ultrasonic transducer (CMUT) arrays can be used. The coupling medium can include a fluid or gel or a solid membrane (e.g., an elastomer or other polymer material), or a combination of fluid, gel, or solid structures. The wedge structures can include a rigid thermoset polymer having known acoustic propagation characteristics (for example, Rexolite® available from C-Lec Plastics Inc.), and water can be injected between the wedge and the structure under test as a coupling medium 156 during testing.

The test instrument 140 can include digital and analog circuitry, such as a front-end circuit 122 including one or more transmit signal chains, receive signal chains, or switching circuitry (e.g., transmit/receive switching circuitry). The transmit signal chain can include amplifier and filter circuitry, such as to provide transmit pulses for delivery through an interconnect 130 to a probe assembly 150 for insonification of the target 158, such as to image or otherwise detect a flaw 160 on or within the target 158 structure by receiving scattered or reflected acoustic energy elicited in response to the insonification.

Although FIG. 1 shows a single probe assembly 150 and a single transducer array 152, other configurations can be used, such as multiple probe assemblies connected to a single test instrument 140, or multiple transducer arrays 152 used with a single or multiple probe assemblies 150 for tandem inspection. Similarly, a test protocol can be performed using coordination between multiple test instruments 140, such as in response to an overall test scheme established from a master test instrument 140, or established by another remote system such as a computing facility 108 or general purpose computing device such as a laptop 132, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 122 can include one or more filters or amplifier circuits, along with an analog-to-digital conversion facility, such as to digitize echo signals received using the probe assembly 150. Digitization can be performed coherently, such as to provide multiple channels of digitized data aligned or referenced to each other in time or phase. The front-end circuit 122 can be coupled to and controlled by one or more processor circuits, such as a processor circuit 102 included as a portion of the test instrument 140. The processor circuit 102 can be coupled to a memory circuit, such as to execute instructions that cause the test instrument 140 to perform one or more of acoustic transmission, acoustic acquisition, processing, or storage of data relating to an acoustic inspection, or to otherwise perform techniques as shown and described herein. The test instrument 140 can be communicatively coupled to other portions of the acoustic inspection system 100, such as using a wired or wireless communication interface 120.

For example, performance of one or more techniques as shown and described herein can be accomplished on-board the test instrument 140 or using other processing or storage facilities such as using a computing facility 108 or a general-purpose computing device such as a laptop 132, tablet, smart-phone, desktop computer, or the like. For example, processing tasks that would be undesirably slow if performed on-board the test instrument 140 or beyond the capabilities of the test instrument 140 can be performed remotely (e.g., on a separate system), such as in response to a request from the test instrument 140. Similarly, storage of data or intermediate data such as A-line matrices of time-series data can be accomplished using remote facilities communicatively coupled to the test instrument 140. The test instrument can include a display 110, such as for presentation of configuration information or results, and an input device 112 such as including one or more of a keyboard, trackball, function keys or soft keys, mouse-interface, touch-screen, stylus, or the like, for receiving operator commands, configuration information, or responses to queries.

The acoustic inspection system 100 can acquire acoustic imaging data of the object under inspection, such as using FMC, half matrix capture (HMC), virtual source aperture (VSA), or plane wave imaging, of a material using an acoustic acquisition technique, such as an acoustic phased array system. The processor circuit 102 can then generate an acoustic imaging data set, such as a scattering matrix (S-matrix), plane wave matrix, or other matrix or data set, corresponding to an acoustic propagation mode, such as pulse echo direct (TT), self-tandem (TT-T), and/or pulse echo with skip (TT-TT).

Using the acoustic imaging data, e.g., FMC data, and a time-of-flight (TOF) delay associated with a medium, such as water, the processor circuit 102 or another processor circuit can generate an encoded acoustic image of the object under inspection. For example, the encoded acoustic image can be generated using techniques such as a total focusing method (TFM) technique.

To generate an image, an acoustic inspection system, such as the acoustic inspection system 100 of FIG. 1, can use inspection parameters and generation parameters. Inspection parameters need to be known, such as by being input by an operator before a scan begins, without regards to the final acoustic image to be generated. Inspection parameters can include the following: A-scan start (time at the first sample data), sample time resolution, frequency of the probe, number of elements in the probe, and other characteristic of the probe such as element size, pitch, and bandwidth of the probe.

Generation parameters and many inspection parameters are used to generate an acoustic image from the acoustic data. Generation parameters can include selected acoustic mode, nominal thickness of part, acoustic velocities of different mode (pressure wave, shear wave, Rayleigh wave) in the different material (part, wedge), and a region of interest (size, position, and/or resolution). An acoustic image, such as a TFM image, can be generated using at least one generation parameter and first acoustic data, such as FMC data, where the first acoustic data can be acquired at least in part by an acoustic acquisition technique, such as an acoustic phased array system.

Figures 3, 4:
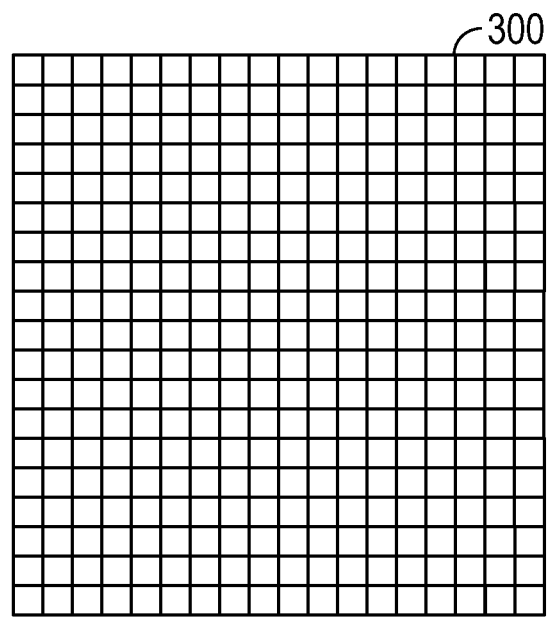
FIG. 3 is a conceptual diagram of a grid that can be used to implement various techniques of this disclosure.
FIG. 4 is an example of a coefficient matrix A that can be used to compute the delays at any pixel position (x, z) in a TFM grid.

In some approaches, a processor, such as the processor circuit 102 of FIG. 1, can compute the time delays of a TFM grid, such as the grid shown in FIG. 3. That is, to reduce computational burden, the processor can use a low-order polynomial function to interpolate time delays from close combinations of elements and grid points. As such, only a small portion of the time delays needed for acoustic imaging need to be computed through optimization. Then, the processor can generate a matrix $\hat{A}$ of those time delays from the TFM grid.

In accordance with this disclosure, the acoustic inspection system 100 of FIG. 1 can be used to compensate a TFM delay computation live (e.g., during acquisition) as a function of the measured thickness along the scan axis of a probe of an acoustic inspection system. At various scan positions, the acoustic inspection system 100 can determine or otherwise acquire the thickness of the object under inspection, such as the target 158. With the determined thickness of the object, the acoustic inspection system 100 can compute the delays used for the TFM computation to reflect the true thickness at the scan position of the probe assembly.

For example, a processor, such the processor circuit 102 of the acoustic inspection system 100 of FIG. 1, can use linear interpolation between two thicknesses to compensate the delays for any thickness at around ±15% of the nominal thickness $T_N$. Hence the delays can be computed for a first (e.g., minimum) thickness $T_m=0.85T_N$ and a second (e.g., maximum) thickness $T_M=1.15T_N$. The processor can then generate a matrix of time delay representations (or a time delay matrix), such as including coefficients of a polynomial equation, time in seconds, sample positions, and the like, for both thicknesses $T_m$ and $T_M$, which can be used to interpolate the delays for any thickness T between $[T_m, T_M]$. The new delay computation can be represented by Equation 1 below. Equation 1:

$$\tau(n, \vec{x}, T) = \tau(n, \vec{x}, T_m) + \rho(\tau(n, \vec{x}, T_M) - \tau(n, \vec{x}, T_m))$$

where $\tau$ represents the time delay, n represents the element, x represents the vector to the grid point, $T_m$ represents a first (e.g., minimum thickness) and $T_M$ represents a second (e.g., maximum) thickness. The factor p corresponds to the ratio of thicknesses and can be determined using Equation 2 below:

$$\rho = \frac{T - T_m}{T_M - T_m} \quad \text{Equation 2}$$

Figure 2:
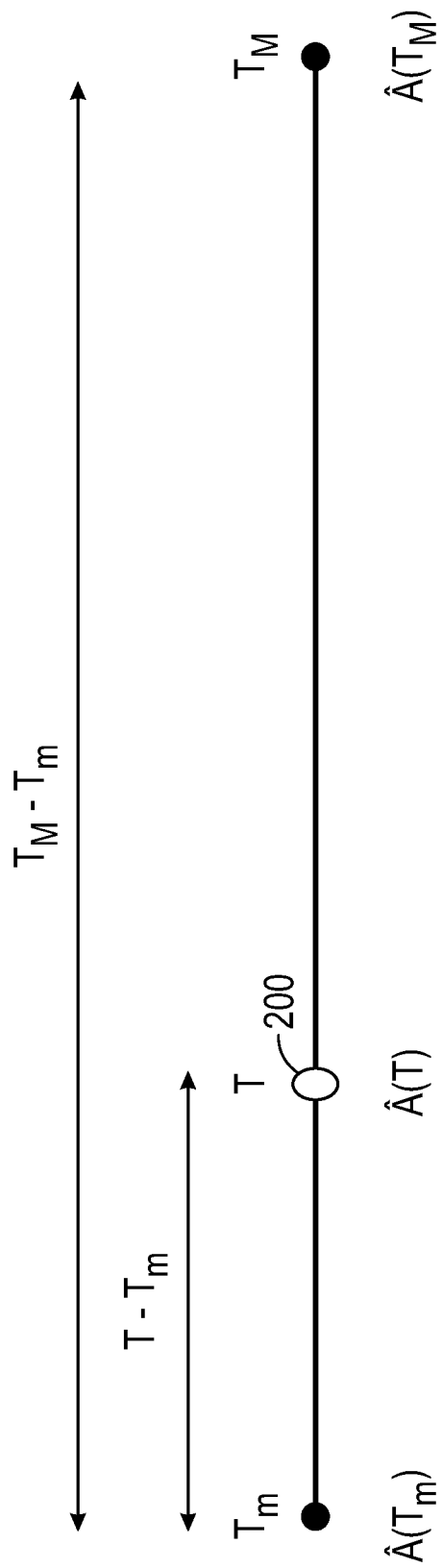
FIG. 2 is a conceptual diagram illustrating various techniques of this disclosure.

FIG. 2 is a conceptual diagram illustrating various techniques of this disclosure. An acoustic inspection system, such as the acoustic inspection system 100 of FIG. 1, can estimate a first (e.g., minimum) thickness $T_m$ of an object under inspection and can estimate a second (e.g., maximum) thickness $T_M$ of the object under inspection. A processor, such as the processor circuit 102 of FIG. 1, can use a representation, e.g., actual thickness, a percentage of a nominal thickness, etc., of the estimated first thickness $T_m$ to determine a first set of time delays associated with an acoustic source, such as with a virtual source aperture or with elements of a phased array probe of an ultrasound inspection system, such as by using Equations 1 and 2. Then, the processor can generate a first matrix $\hat{A}(T_m)$ of time delay representations, such as including coefficients of a polynomial equation, time in seconds, sample positions, and the like. The first matrix $\hat{A}(T_m)$ of time delay representations is shown below:

10

$$\hat{A}(T_m) = \begin{bmatrix} \tau_{0,0}(T_m) & \cdots & \tau_{N,0}(T_m) \\ \vdots & \ddots & \vdots \\ \tau_{N,0}(T_m) & \cdots & \tau_{N,N}(T_m) \end{bmatrix}$$

Similarly, the processor can use a representation, e.g., actual thickness, a percentage of a nominal thickness, etc., of the estimated second thickness $T_M$ to determine a second set of time delays associated with the acoustic source. Then, the processor can generate a second matrix $\hat{A}(T_M)$ of time delay representations, such as including coefficients of a polynomial equation, time in seconds, sample positions, and the like. The second matrix $\hat{A}(T_M)$ of time delay representations is shown below:

$$\hat{A}(T_M) = \begin{bmatrix} \tau_{0,0}(T_M) & \cdots & \tau_{N,0}(T_M) \\ \vdots & \ddots & \vdots \\ \tau_{N,0}(T_M) & \cdots & \tau_{N,N}(T_M) \end{bmatrix}$$

The processor can generate the first and second matrices using the TFM grid, an example of which being shown in FIG. 3.

Then, at a first position 200, the processor can use a representation, such as a derivative, of the first and second sets of time delays and a determined thickness of the object at the first position 200, to interpolate a representation of another set of time delays associated with the acoustic source, such as one or more electroacoustic transducers associated with a probe of the probe assembly 150 of FIG. 1, such as using a linear probe, dual matrix probe, a phased array probe, and the like. The processor can perform the interpolation linearly or using a second or higher order polynomial equation.

The processor can use Equations 1 and 2 to determine a matrix $\hat{A}(T)$ that represents the interpolated set of time delays. In particular, the processor can use Equation 3 below to determine the matrix $\hat{A}(T)$ of time delay representations. Equation 3:

$$\hat{A}(T) = \hat{A}(T_m) + \rho[\hat{A}(T_M) - \hat{A}(T_m)] = \hat{A}(T_m) + \rho \Delta \hat{A}$$

In some examples, the matrix $\hat{A}(T)$ of time delay representations can include a matrix $\hat{A}(T)$ of time delays in seconds. In other examples, the matrix $\hat{A}(T)$ of time delay representations can include a matrix $\hat{A}(T)$ of coefficients of a polynomial equation that can be used to determine the time delays using interpolation. For example, a processor can use Equation 4 below to interpolate the time delay $t(x_k, z)$ at each position $(x_k, z)$ of the TFM grid 300 of FIG. 3. That is, Equation 4 can provide a time delay for a point using a matrix of coefficients of a polynomial equation. Equation 4:

$$t(x_k, z) = a_0^{x_k} + a_1^{x_k} z^1 + a_2^{x_k} z^2 + a_3^{x_k} z^3 + a_4^{x_k} z^4 = \sum_{\ell=0}^{n_z-1} a_\ell^{x_k} z^\ell$$

The acoustic inspection system can then acquire acoustic data, e.g., FMC data, at the first position using the probe and can generate, using the interpolated set of time delays and the acoustic data at the first position, an acoustic image of the object at the first position.

FIG. 3 is a conceptual diagram of a grid 300 that can be used to implement various techniques of this disclosure. In TFM, a region-of-interest (ROI) can be defined as a grid, such as the grid 300, that includes columns and rows and a number of points or pixels that are represented by the intersections on the grid of the columns and rows. Each transmitter/receptor pair on the probe assembly requires a different delay.

FIG. 4 is an example of a coefficient matrix Â that can be used to compute the delays at any pixel position (x, z) in a TFM grid. The coefficient matrix Â, such as generated using Equation 3 above, can be used to compute the time delays using interpolation at a particular row and column of the TFM grid for an element. Each row corresponds to a different node along the depth axis and each column corresponds to a column of the TFM grid. In FIG. 4, τ represents the delays and a matrix A is needed for each element combination n.

Figure 5:
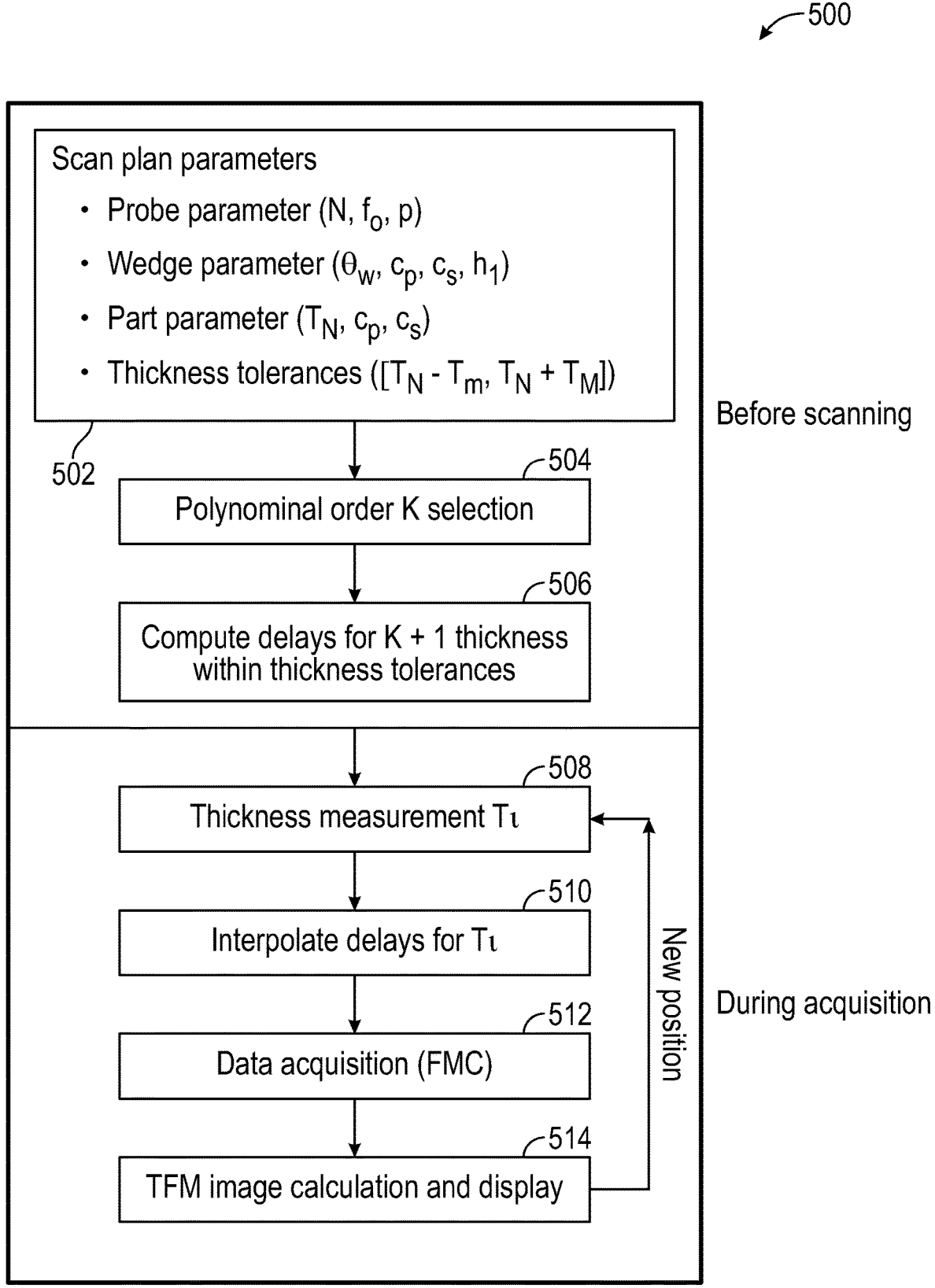
FIG. 5 is an example of a flow diagram of a computer-implemented method of adapting time delays of an ultrasound inspection system during data acquisition.

FIG. 5 is an example of a flow diagram of a computer-implemented method 500 of adapting time delays of an ultrasound inspection system during data acquisition. Before scanning, various scan parameters are known at block 502, including probe parameters, wedge parameters, part parameters, and thickness tolerances.

Also, before scanning, a polynomial order k can be selected at block 504 for the coefficient interpolation, such as automatically or by a user. The polynomial order k can be k=1 (linear), k=2, or a higher order. In some examples, the polynomial order can be selected based on the range of the tolerance. For example, a polynomial order k=1 can be selected for a range of tolerances of +/−15%. As another non-limiting example, a polynomial order k=2 can be selected for a range of tolerances of +/−40%.

Finally, before scanning, at block 506, a processor can compute sets of time delays for k+1 thicknesses within the thickness tolerance. Continuing the example above, if a polynomial order k=1 (linear interpolation) is selected for a range of tolerances of +/−15%, then the processor can compute 2 thicknesses within the thickness tolerance of +/−15%, such at a first (e.g., minimum) thickness $T_m=0.85T_N$ and a second (e.g., maximum) thickness $T_M=1.15T_N$, where $T_N$ is the nominal thickness. Then, using these 2 thicknesses, the processor can compute corresponding time delays for those 2 thicknesses.

The subsequent acts in blocks 508-514 occur during acquisition and are repeated for each scan or acquisition position. At block 508, the acoustic inspection system 100 of FIG. 1, or another system, can determine a thickness measurement for the scan position. At block 510, the processor can interpolate the delays for that scan position using the delays computed previously at block 506, such as using the techniques described above with respect to FIGS. 2-4. In some examples, if the thickness measurement between scan positions has changed by less than a threshold value, the processor can determine that there is no need to re-interpolate the delays at the current scan position and can use the delays from the previous scan position.

At block 512, the processor can acquire acoustic data using the probe, e.g., phased array probe, of the acoustic inspection system. The acoustic data can include full matrix capture (FMC) data, half matrix capture (HMC) data, or plane wave imaging data, for example. In some examples, the processor can determine the thickness measurement at block 510 using the acquired acoustic data, instead of performing two acquisitions.

Finally, at block 514, the processor can generate, using the interpolated set of time delays and the acoustic data, an acoustic image of the object at the position. For example, the processor can generate a total focusing method (TFM) acoustic image of the object at the position. In some examples, the processor can display the image on a display, such as the display 110 of FIG. 1. At each scan position until the scan ends, the blocks 508-514 can be repeated.

In some examples, the processor can adjust the polynomial order k based on tolerance range. That is, the processor can determine, based on a number of sets of time delays, an order k of the polynomial equation, where k+1 sets of time delays at k+1 different corresponding thicknesses within a thickness range are used for the $k^{th}$ order polynomial equation.

For example, the processor can determine, using a representation of an estimated third thickness of the object under inspection, a third set of time delays associated with the acoustic source, e.g., elements of the phased array probe of the ultrasound inspection system. Because there are three sets of time delays, the processor can determine that k=2 and, as such, that a second order polynomial equation can be used. The processor can then interpolate, using a kth order polynomial having a k+1 matrix of coefficients obtained from the k+1 selected thicknesses, a set of time delays associated with the measured thickness of the part at the scan position.

Figure 6:
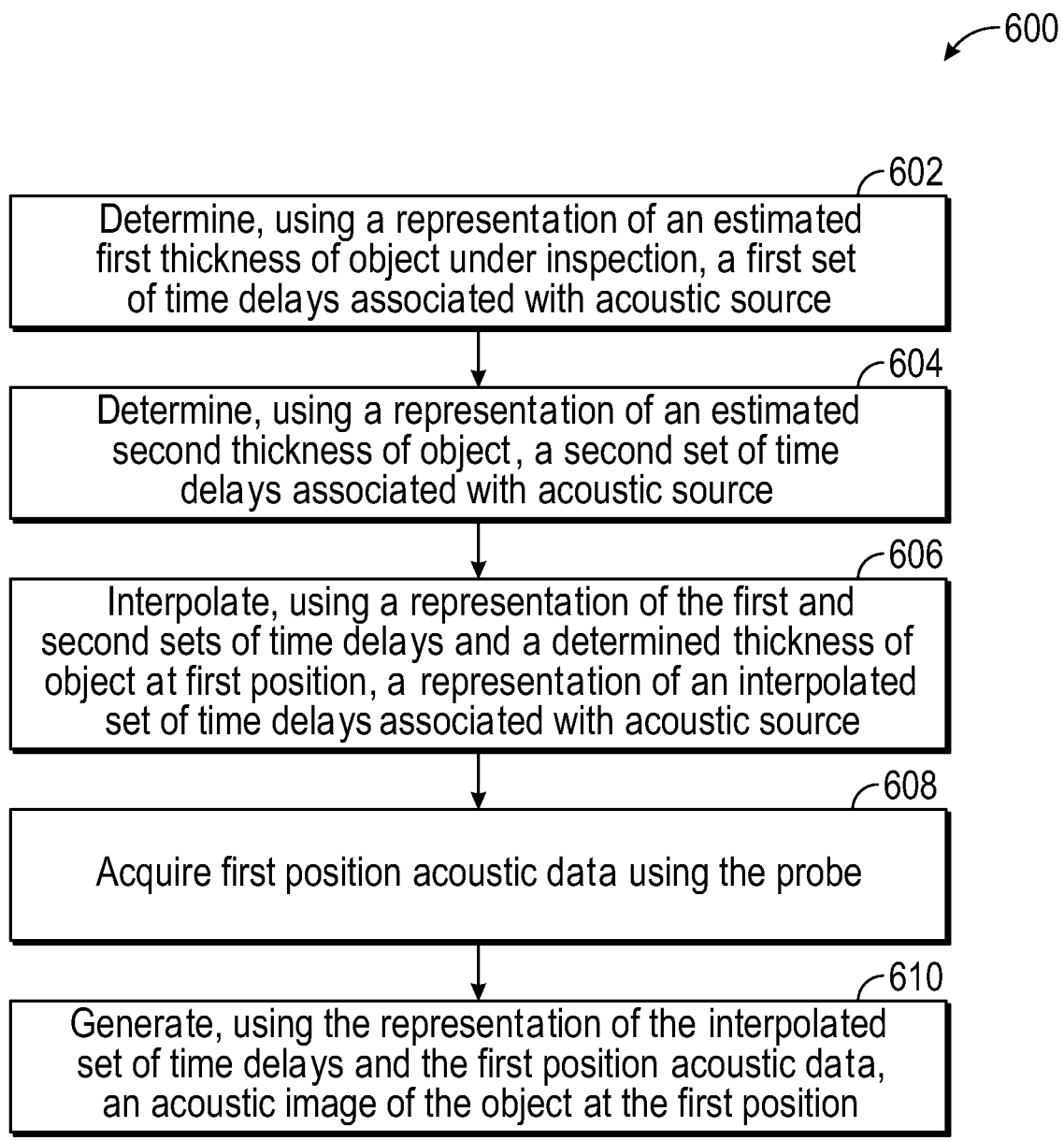
FIG. 6 is another example of a flow diagram of a computer-implemented method of adapting time delays of an ultrasound inspection system during data acquisition.

FIG. 6 is another example of a flow diagram of a computer-implemented method 600 of adapting time delays of an ultrasound inspection system during data acquisition. At block 602, a processor, such as the processor circuit 102 of the acoustic inspection system 100 of FIG. 1, can determine, using a representation of an estimated first thickness of an object under inspection, e.g., an actual thickness, a percentage of a nominal thickness, etc. of the object, a first set of time delays associated with an acoustic source, e.g., one or more electroacoustic transducers, such as a transducer array 152 including respective transducers 154A through 154N. For example, the processor can determine, using a minimum thickness or some other thickness of the object, a first set of time delays associated with an acoustic source, such as by using Equations 2 and 3 above.

Similarly, at block 604, the processor can determine, using a representation of an estimated second thickness of an object under inspection, a second set of time delays associated with the acoustic source. For example, the processor can determine, using a maximum thickness or some other thickness of the object, a second set of time delays associated with an acoustic source, such as by using Equations 2 and 3 above.

At block 606 and at a first position of a probe of the acoustic inspection system positioned on the object, the processor can interpolate, using a representation of the first and second sets of time delays and a determined thickness of the object at the first position, a representation, e.g., a derivative, of an interpolated set of time delays associated with the acoustic source, such as by using Equation 6 above. In some examples, the representation of the interpolated set of time delays can include a matrix of coefficients of a polynomial equation. In other examples, rather than compute all the time delays, a smaller representation can be interpolated, such as by using a matrix of coefficients of a polynomial equation.

In some examples, the processor can use an estimated third thickness of the object for the interpolation. For example, the processor can determine, using a representation of an estimated third thickness of the object under inspection, a third set of time delays associated with the acoustic source. Then, the processor can interpolate, using the first set of time delays, the second set of time delays, the third set of time delays, and a determined thickness of the object at the first position, the interpolated set of time delays associated with the acoustic source.

At block 608 and at the first position of the probe, the processor can acquire first position acoustic data, e.g., FMC data, HMC data, plane wave imaging data, using the probe.

At block 610 and at the first position of the probe, the processor can generate, using the representation of the interpolated set of time delays and the first position acoustic data, an acoustic image of the object at the first position. In some examples, the processor can generate, using the representation of the interpolated set of time delays and the first position acoustic data, a total focusing method (TFM) acoustic image of the object at the first position.

The functions described at blocks 606-610 can be repeated at subsequent positions of the probe. For example, at a second position of the probe positioned on the object, the processor can determine, using a thickness measured at the second position and by interpolation of the first and second sets of time delays, a third set of time delays associated with the acoustic source. The processor can acquire second position acoustic data using the probe, and then generate, using a representation of the third set of time delays and the second position acoustic data, an acoustic image of the object at the second position.

Various embodiments are implemented fully or partially in software and/or firmware. This software and/or firmware can take the form of instructions contained in or on a non-transitory computer-readable storage medium. Those instructions can then be read and executed by one or more processors to enable performance of the operations described herein. The instructions are in any suitable form, such as but not limited to source code, compiled code, interpreted code, executable code, static code, dynamic code, and the like. Such a computer-readable medium can include any tangible non-transitory medium for storing information in a form readable by one or more computers, such as but not limited to read only memory (ROM); random access memory (RAM); magnetic disk storage media; optical storage media; flash memory; etc.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the aspects. Also, in the above Detailed Description, various features may be grouped together to streamline the disclosure. This should not be interpreted as intending that an unclaimed disclosed feature is essential to any aspect. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments may be combined with each other in various combinations or permutations. The scope of the invention should be determined The claimed invention is:

1. A computer-implemented method of adapting time delays of an ultrasound inspection system during data acquisition, the computer-implemented method comprising:
   determining, using a representation of an estimated first thickness of an object under inspection, a first set of time delays associated with an acoustic source;
   determining, using a representation of an estimated second thickness of the object, a second set of time delays associated with the acoustic source; and
   at a first position of a probe positioned on the object:
      interpolating, using a representation of the first and second sets of time delays and a determined thickness of the object at the first position, a representation of an interpolated set of time delays associated with the acoustic source;
      acquiring first position acoustic data using the probe; and
      generating, using the representation of the interpolated set of time delays and the first position acoustic data, an acoustic image of the object at the first position.

2. The computer-implemented method of claim 1, comprising:
   determining, based on a number of sets of time delays, an order of a polynomial equation, wherein k+1 sets of time delays at k+1 different corresponding thicknesses within a thickness range are used for a $k^{th}$ order polynomial equation,
   wherein interpolating, using the representation of the k+1 sets of time delays and the determined thickness of the object at the first position, the interpolated set of time delays associated with the acoustic source includes:
      interpolating, using the $k^{th}$ polynomial having a k+1 matrix of coefficients obtained from the k+1 different corresponding thicknesses, a set of time delays associated with the determined thickness of the object.

3. The computer-implemented method of claim 2, wherein the determined order is a first order.

4. The computer-implemented method of claim 2, wherein the determined order is a second order.

5. The computer-implemented method of claim 4, comprising:
   determining, using a representation of an estimated third thickness of the object under inspection, a third set of time delays associated with elements of the acoustic source,
   wherein the interpolating further includes using the third set of time delays.

6. The computer-implemented method of claim 1, comprising:
   determining the thickness of the object at the first position.

7. The computer-implemented method of claim 1, wherein the representation of the interpolated set of time delays includes a matrix of coefficients of a polynomial equation.

8. The computer-implemented method of claim 1, wherein the representation of the interpolated set of time delays includes a matrix of time delays.

9. The computer-implemented method of claim 1, wherein acquiring the first position acoustic data using the probe includes:
   acquiring first position full matrix capture (FMC) data.

10. The computer-implemented method of claim 1, wherein acquiring the first position acoustic data using the probe includes:
    acquiring first position half matrix capture (HMC) data.

11. The computer-implemented method of claim 1, wherein acquiring the first position acoustic data using the probe includes:
    acquiring first position plane wave imaging data.

12. The computer-implemented method of claim 1, wherein generating, using the interpolated set of time delays and the first position acoustic data, the acoustic image of the object at the first position includes:
    generating, using the representation of the interpolated set of time delays and the first position acoustic data, a total focusing method (TFM) acoustic image of the object at the first position.

13. The computer-implemented method of claim 1, comprising:
    at a second position of the probe positioned on the object:
       determining, using a thickness measured at the second position and by interpolation of the first and second sets of time delays, a third set of time delays associated with the acoustic source;
       acquiring second position acoustic data using the probe; and
       generating, using a representation of the third set of time delays and the second position acoustic data, an acoustic image of the object at the second position.

14. An ultrasound inspection system for adapting time delays during data acquisition, the ultrasound inspection system comprising:
    a probe to be positioned on an object under inspection; and
    a processor to:
       determine, using a representation of a first thickness of an object under inspection, a first set of time delays associated with an acoustic source;
       determine, using a representation of a second thickness of the object, a second set of time delays associated with the acoustic source; and
       at a first position of the probe positioned on the object:
          interpolate, using the first and second sets of time delays and a determined thickness of the object at the first position, a representation of an interpolated set of time delays associated with the acoustic source;
          acquire first position acoustic data using the probe; and
          generate, using the representation of the interpolated set of time delays and the first position acoustic data, an acoustic image of the object at the first position.

15. The ultrasound inspection system of claim 14, the processor to:
    determine, using a representation of an estimated third thickness of the object under inspection, a third set of time delays associated with the acoustic source,
    wherein the processor to interpolate, using the first and second sets of time delays and the determined thickness of the object at the first position, the interpolated set of time delays associated with the acoustic source is configured to:
    interpolate, using the first set of time delays, the second set of time delays, the third set of time delays, and the determined thickness of the object at the first position, the interpolated set of time delays associated with the acoustic source.

16. The ultrasound inspection system of claim 14, the processor to:
   determine, using the probe, the thickness of the object at the first position.

17. The ultrasound inspection system of claim 14, wherein the representation of the interpolated set of time delays includes a matrix of coefficients of a polynomial equation.

18. The ultrasound inspection system of claim 14, wherein the representation of the interpolated set of time delays includes a matrix of time delays.

19. The ultrasound inspection system of claim 14, wherein the processor to acquire the first position acoustic data using the probe is configured to:
   acquire first position full matrix capture (FMC) data.

20. The ultrasound inspection system of claim 14, wherein the processor to acquire the first position acoustic data using the probe is configured to:
   acquire first position half matrix capture (HMC) data.

21. The ultrasound inspection system of claim 14, wherein the processor to acquire the first position acoustic data using the probe is configured to:
   acquire first position plane wave imaging data.

22. The ultrasound inspection system of claim 14, wherein the processor to generate, using the interpolated set of time delays and the first position acoustic data, the acoustic image of the object at the first position is configured to:
   generate, using the interpolated set of time delays and the first position acoustic data, a total focusing method (TFM) acoustic image of the object at the first position.

23. The ultrasound inspection system of claim 14, comprising:
   at a second position of the probe positioned on the object, the processor to:
   determine, using a thickness measured at the second position and by interpolation of the first and second sets of time delays, a third set of time delays associated with the acoustic source;
   acquire second position acoustic data using the probe; and
   generate, using a representation of the third set of time delays and the second position acoustic data, an acoustic image of the object at the second position.

24. A computer-implemented method of adapting time delays of an ultrasound inspection system during data acquisition, the computer-implemented method comprising:
   determining, using a representation of an estimated minimum thickness of an object under inspection, a first set of time delays associated with an acoustic source;
   determining, using a representation of an estimated maximum thickness of the object, a second set of time delays associated with the acoustic source; and
   at a first position of a probe positioned on the object:
   interpolating, using the first and second sets of time delays and a determined thickness of the object at the first position, a representation of an interpolated set of time delays associated with the acoustic source;
   acquiring first position acoustic data using the probe; and
   generating, using the representation of the interpolated set of time delays and the first position acoustic data, an acoustic image of the object at the first position.

* * * * *